L. C. Field,
Mashing Machine.
No. 94,730.   Patented Sep. 14, 1869.
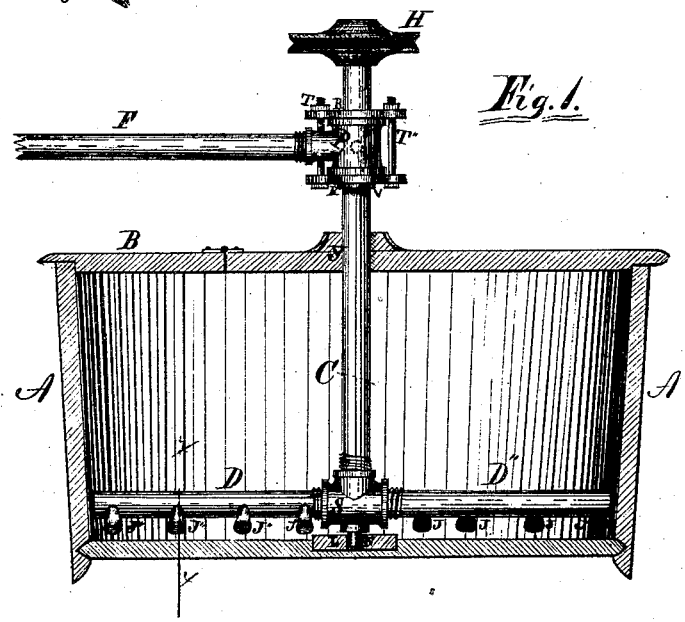

United States Patent Office.

LOYAL C. FIELD, OF GALESBURG, ILLINOIS.

Letters Patent No. 94,730, dated September 14, 1869.

IMPROVEMENT IN MASHING-MACHINES.

The Schedule referred to in these Letters Patent and making part of the same.

*To all whom it may concern:*

Be it known that I, LOYAL C. FIELD, of the city of Galesburg, county of Knox, and State of Illinois, have invented certain new and useful Improvements in Mashing-Machines; and I do hereby declare that the following is a full, clear, and exact description of the same, reference being had to the accompanying drawings, making a portion of this specification, in which—

Figure 1 is a vertical sectional view of the mash-tub, and an elevation of the other mechanism.

Figure 2 is a cross-section of one of the horizontal arms H, fig. 1, on the line $x\ x$.

Similar letters of reference indicate corresponding parts in both figures.

The object of this invention is not only to produce a mashing-machine for the use of distilleries, &c., but more especially to provide means for rapidly, cheaply, and thoroughly cooking feed for animals.

The invention consists in a central, vertical, hollow shaft, with bearings in the lid and bottom of a tub. This shaft is revolved by means of a pulley on its upper end, and carries on its lower end two horizontal arms, through which the hot steam passes and escapes through projecting jets, while the shaft is revolving, and at the same time stirring the feed. The steam is admitted through a pipe, with a suitable tight connection, as hereafter described.

To enable others to understand the nature, construction, and operation of my invention, I will proceed to describe it, with reference to the drawings.

A represents a tub, which may be made of any suitable size and dimensions.

C represents an upright, hollow shaft, with the bearing L N, in the bottom of the tub, and the bearing $y$ in the lid.

H is a pulley on the upper end of the shaft C, for connecting with any suitable power to drive it.

D D" represent horizontal arms, near the bottom of the tub A, and with their inner ends screwed into the T-head S on the shaft C.

J J J" J" represent jets attached to the arms D D", the inclination and shape of which are shown at fig. 2, a cross-section of the arm D on the line $x\ x$.

F represents a pipe leading from any suitable steam-generator, and leading into the chamber P.

This chamber P is large enough to leave an annular opening around the shaft C, and is made steam-tight at the ends, by means of the caps R R and bolts T T", and packing in the usual manner, and is held in position on the shaft C by means of the collar V.

The steam from the pipe F is admitted to the shaft C by means of holes shown by the dotted lines W.

B is a hinged lid, where the feed may be inserted and the operation of cooking watched.

The feed being placed in the tub, the shaft C made to revolve, and the steam admitted, the operation is evident.

The arms D revolving, will not only serve to stir and incorporate the mass, but carry the escaping and hot steam to all parts of the same, thereby rendering the cooking thorough, uniform, and rapid.

The steam escaping, as it does, too, near the bottom of the tub, will tend to keep the feed from baking or adhering thereto.

Having thus described my invention,

What I claim as new, and desire to secure by Letters Patent, is—

The tub A, shaft C, arms D D", jets J J", pulley H, pipe F, and chamber P, combined and arranged as described, and for the purpose set forth.

Signed at Galesburg, Illinois, this 20th day of March, 1869.

LOYAL C. FIELD.

Witnesses:
PLATT R. RICHARDS,
J. B. HARSH.